(No Model.) 2 Sheets—Sheet 2.

W. W. LAING.
GAS PRESSURE GOVERNING APPARATUS.

No. 536,728. Patented Apr. 2, 1895.

Witnesses
John C. Shaw

Inventor
Walter W. Laing,
By his Attorneys.
C. A. Snow & Co.

UNITED STATES PATENT OFFICE.

WALTER W. LAING, OF CHERRY VALE, KANSAS, ASSIGNOR OF THREE-FOURTHS TO CHRISTIANA E. DEMING AND THE CHERRY VALE GAS COMPANY, OF SAME PLACE.

GAS-PRESSURE-GOVERNING APPARATUS.

SPECIFICATION forming part of Letters Patent No. 536,728, dated April 2, 1895.

Application filed October 29, 1894. Serial No. 527,313. (No model.)

*To all whom it may concern:*

Be it known that I, WALTER W. LAING, a citizen of the United States, residing at Cherry Vale, in the county of Montgomery and State of Kansas, have invented a new and useful Gas-Pressure-Governing Apparatus, of which the following is a specification.

My invention relates to improvements in gas-pressure governing apparatus, and it has for its objects to provide a simple and effective device for automatically controlling the pressure, whereby excessive pressure in the service pipes is prevented; to provide simple means for sealing the various joints between the parts or members of the device; and to provide efficient means for purifying the gas and removing moisture therefrom.

Further objects and advantages of the invention will appear in the following description, and the novel features thereof will be particularly pointed out in the appended claims.

Figure 1:
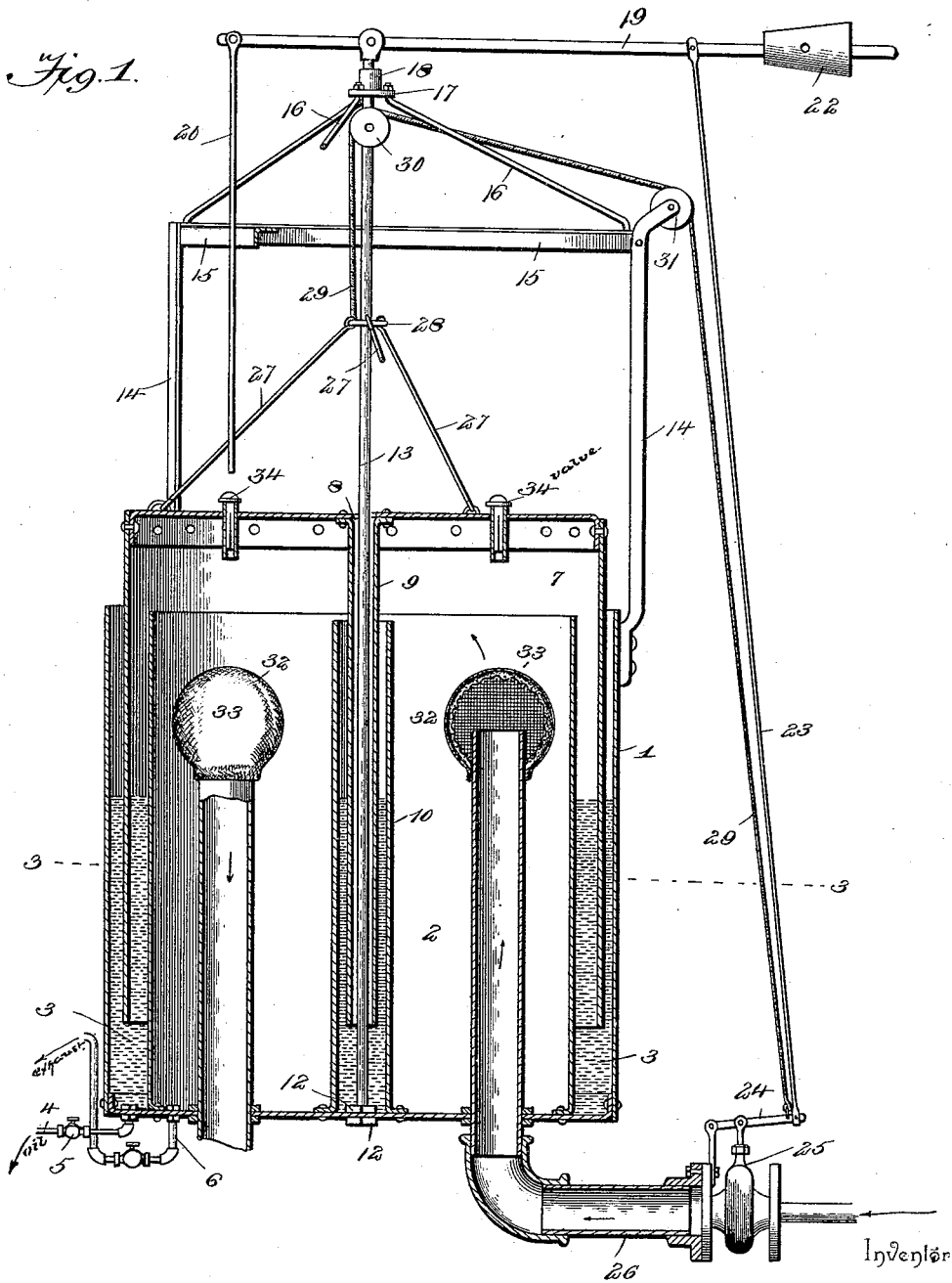
Figure 2:
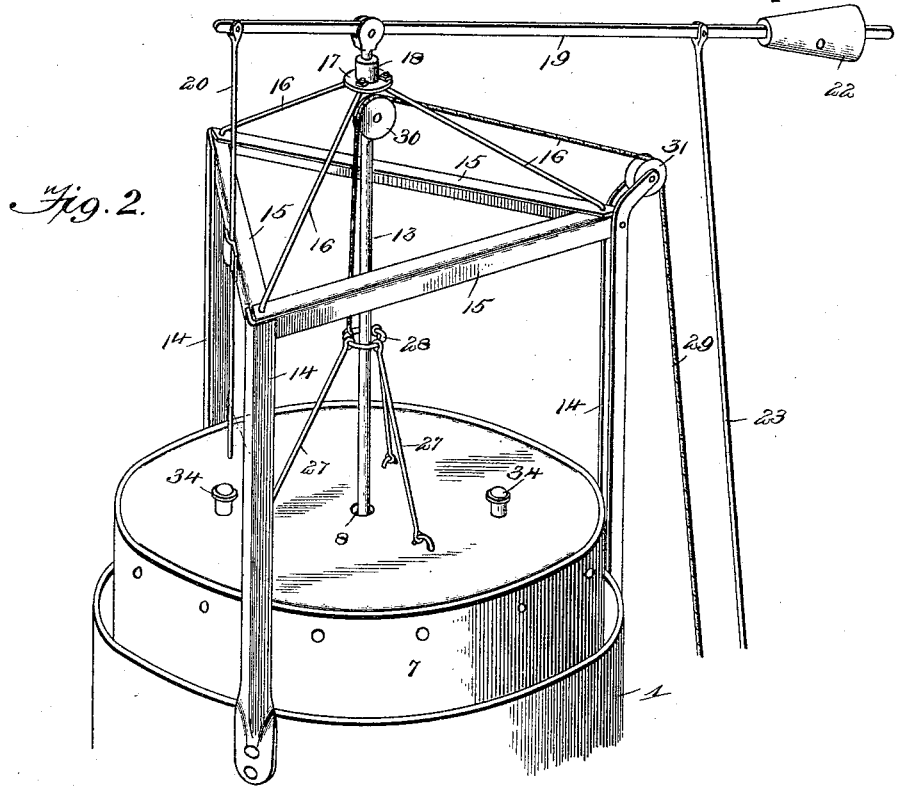
Figure 3:
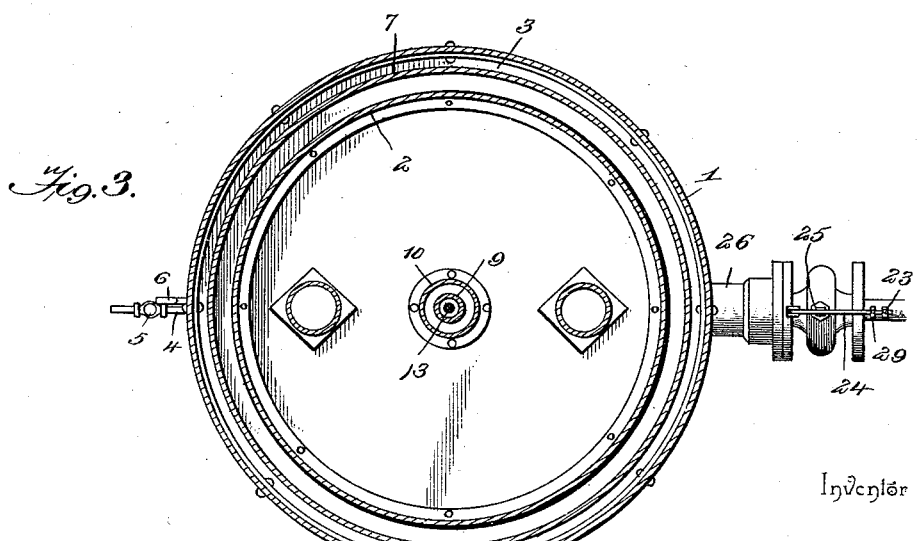

In the drawings: Figure 1 is a vertical central section of the apparatus. Fig. 2 is a perspective view of the upper portion of the mechanism, showing the operating lever and connections. Fig. 3 is a horizontal section on the line 3—3 of Fig. 1.

Similar numerals of reference indicate corresponding parts in all the figures of the drawings.

1 designates an outer cylinder or shell, within which is arranged an inner concentric cylinder 2 having its lower edges turned laterally and bolted or riveted to the bottom of the outer cylinder. The inner cylinder is spaced from the wall of the outer cylinder to form an annular sealing chamber 3, containing oil or other suitable liquid and communicating with the bottom of this chamber is an outlet tube 4, provided with a valve 5, for removing the said liquid. Communicating with the interior of the inner cylinder or gas reservoir is an exhaust pipe 6 for removing water deposited therein by the gas.

The inverted or bell float 7 is arranged to cover the inner cylinder, with its sides inserted between the spaced walls of the inner and outer cylinders, the top of said float being provided with a central opening 8 registering with a sealing-tube 9 which depends from the top of the float and fits in a sealing liquid in the inclosing stationary tube 10, fixed at its lower end to the bottom of the outer cylinder. Secured to the bottom of the said cylinder, at the center of the tube 10, and held in place by means of lock nuts 12 which are arranged upon the same to bear against the inner and outer surfaces of the bottom of the cylinder, is a vertical guide-tube 13, which extends up through the sealing-tube and projects above the top of the float.

Sectionally angular standards 14 are attached at their lower ends to the walls of the outer cylinder and are connected at their upper ends by the horizontal bars 15, forming a triangular frame, and braces 16 connect the upper ends of the standards to the upper extremity of the guide 13, the adjacent ends of said braces being fitted in perforations in a flange 17 of the cap 18 and being engaged by nuts bearing upon the surface of said flange. The lever 19 is pivoted to the said cap and to the short arm thereof is attached a push-rod 20 arranged at its lower end in the path of the float. The longer arm of the lever is provided with a weight 22 and is connected by means of a rod 23 to a lever 24 which is connected to the stem 25 of a valve controlling the flow of gas through the inlet or supply-pipe 26. Slidably mounted upon the guide 13, and connected to the float by means of the rods 27, is a ring 28, and attached to the latter is one end of a cord or chain 29 which extends over direction pulleys 30 and 31 and is attached at the other end to the said lever 24. The upward movement of the float is communicated through the push-bar, operating lever, connecting rod and valve-stem lever 24 to the valve, whereby the latter is partly closed to obstruct the flow of gas to the governor, and the downward movement of said float is communicated by the cord or chain to said lever 24 to open the valve. Under ordinary circumstances, if the ascent of the float is slow, the weight on the end of the operating-lever will take up the slack in the cord or chain and thus close the valve, but if through any imperfection in the operation of the parts the lever should move sluggishly the necessary motion will be communicated to the said lever by means of the push-rod, as described.

The inlet pipe 26 extends vertically into the inner cylinder and the outlet pipe is similarly arranged, the open ends of said pipes being provided with shields 32, spherical in shape, which are constructed of inner cages of wire-gauze or its equivalent, and outer coverings of fibrous material, such as absorbent cotton, shown at 33. This shield catches impurities and moisture, depositing the latter in the inner cylinder, from which it may be drawn by means of the relief pipe 6, above described.

Safety valves 34 are arranged in the top of the float vertically over the shields of the inlet and outlet pipes, to relieve excessive pressure, and said valves serve an additional function of allowing access to the cylinder to apply chemicals to the absorbent cotton forming part of the shield to remove impurities in the gas.

The operation of the apparatus will be readily understood from the foregoing description, and it will be seen that various changes in the form, proportion, and minor details of construction may be resorted to without departing from the spirit or sacrificing any of the advantages of the invention.

Having thus described my invention, I claim—

1. In a device of the class described, the combination, with a valve, and a float exposed to gas pressure, of a lever fulcrumed at an intermediate point upon a support arranged above the float, a connecting rod between one arm of the lever and the valve, and a push-rod attached to the other arm of the lever and arranged at its extremity in the path of the float, and spaced therefrom to allow a limited movement of the float before affecting the valve, substantially as specified.

2. The combination with a valve, and a float exposed to gas pressure, of an operating-lever, a push-rod attached to said lever and arranged in the path of the float, a second lever connected to the stem of said valve, a rod connecting said levers, and a cord or chain attached at one end to said second lever and at the other end to the float, and traversing suitable direction pulleys, substantially as specified.

3. The combination with a valve, and a float exposed to gas pressure, of a guide concentric with the float, a ring mounted upon the guide and connected rigidly to the float, an operating-lever fulcrumed upon the guide and having a push-bar arranged at one end in the path of the float, a second lever connected to the stem of said valve, a rod connecting said levers, and a cord or chain connecting the second lever and said slidable ring and traversing direction pulleys, substantially as specified.

4. The combination with inner and outer concentric-cylinders, inlet and outlet pipes, the former having a controlling valve, a float dipping in a sealing fluid arranged in the space between the walls of the inner and outer cylinders, and connections between the float and said valve in the inlet-pipe, of shields arranged upon the open ends of the inlet and outlet pipes and comprising gauze cages and covering of fibrous or absorbent material, substantially as specified.

5. The combination with inner and outer cylinders, inlet and outlet pipes, the former being provided with a valve, a float, and connections between the float and said valve, of shields arranged over the open ends of the said pipes and having absorbent coverings, and safety-valves arranged in the top of the float, vertically over said shields substantially as specified.

6. The combination with inner and outer concentric cylinders, an inverted float fitting between the walls of said cylinders and dipping in sealing liquid, a tube rising from the bottom of the outer cylinder and containing sealing liquid, a sealing-tube depending from the top of the float and dipping in said sealing liquid, a guide attached to the bottom of the outer cylinder and extending upward through said sealing-tube, inlet and outlet pipes communicating with the interior of the inner cylinder, a valve arranged in the inlet-pipe, a lever fulcrumed on the upper end of said guide a push-rod carried by said lever in the path of the float, a frame rising from the outer cylinder and connected by braces with said guide, and connections between said lever and the valve, substantially as specified.

In testimony that I claim the foregoing as my own I have hereto affixed my signature in the presence of two witnesses.

WALTER W. LAING.

Witnesses:
J. H. BUTLER,
CHAS. L. JOHNSTON.